(12) United States Patent
Banks et al.

(10) Patent No.: US 8,273,145 B2
(45) Date of Patent: Sep. 25, 2012

(54) CAM-TYPE LOCKING DEVICE FOR RETAINING STATIC FILTER PANELS IN A FILTER HOLDING FRAME

(75) Inventors: Stephen Francis Banks, Yateley (GB); Peter McGuigan, Selborne (GB)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 12/880,496

(22) Filed: Sep. 13, 2010

(65) Prior Publication Data
US 2012/0060454 A1 Mar. 15, 2012

(51) Int. Cl.
*B01D 46/00* (2006.01)
(52) U.S. Cl. ............... 55/480; 55/482; 55/483; 55/484; 55/493; 55/502
(58) Field of Classification Search ............. 55/DIG. 31, 55/480–481, 483–484, 492–493, 501–502, 55/506–507; 74/567; 312/296
See application file for complete search history.

(56) References Cited

U.S. PATENT DOCUMENTS

| 7,540,073 | B1 | 6/2009 | Gilstrap |
| 8,062,401 | B2* | 11/2011 | O'Connell et al. ............. 55/480 |
| 2009/0158886 | A1* | 6/2009 | O'Connell et al. ............. 74/567 |

* cited by examiner

*Primary Examiner* — Duane Smith
*Assistant Examiner* — Karla Hawkins
(74) *Attorney, Agent, or Firm* — Nixon & Vanderhye, P.C.

(57) ABSTRACT

A filter holder assembly includes at least one frame having a peripheral wall and an inwardly directed peripheral edge substantially perpendicular to said peripheral wall and adapted to support a filter. At least one cam lock lever is secured to the peripheral wall at a first predetermined distance from the inwardly directed peripheral edge for compressing the filter in the frame and against said inwardly directed peripheral edge. The cam lock lever has a handle portion at one end thereof and a cam head provided with a cam foot at an opposite end thereof. The cam lock lever is rotatable to cause the cam foot to move between an open position and clamping position where the cam foot exerts a compressive force on the filter.

20 Claims, 10 Drawing Sheets

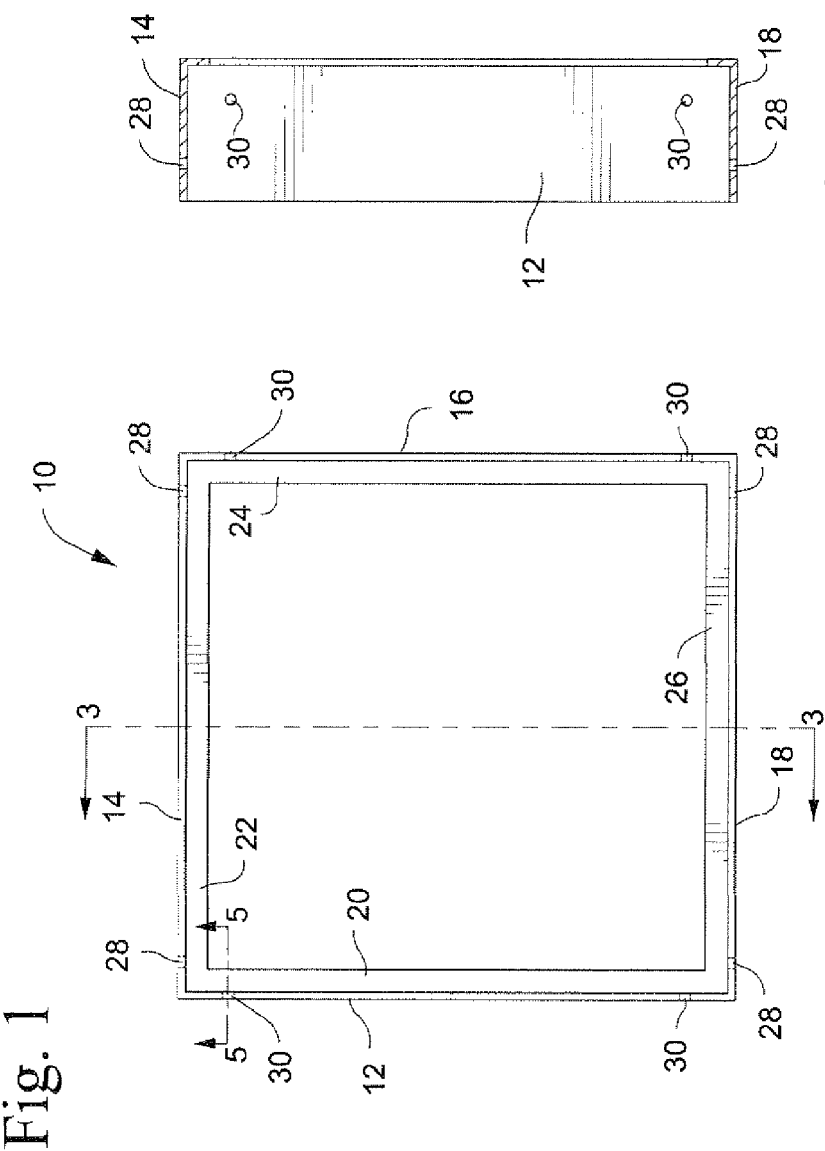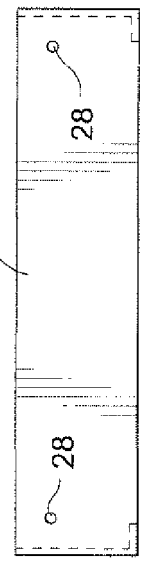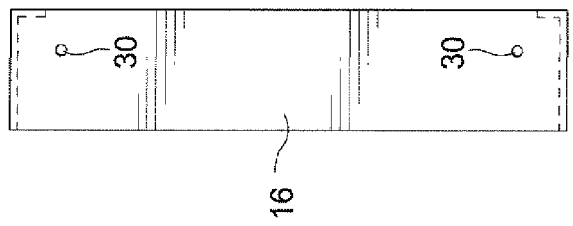

US 8,273,145 B2

CAM-TYPE LOCKING DEVICE FOR RETAINING STATIC FILTER PANELS IN A FILTER HOLDING FRAME

BACKGROUND OF THE INVENTION

This invention relates to turbine inlet air filtration systems and, more specifically, to a filter holding frame assembly that incorporates devices for holding one or more filters in a surrounding frame.

Gas turbines used for power generation are frequently located in industrial areas close to other combustion sources where the local atmosphere can contain high levels of small particulates such as carbon. Power plants may also be located in deserts and other arid environments where high levels of particulates such as sand can also significantly impair the performance of the turbine. It is therefore essential that inlet air filtration systems be optimized to minimize negative impact on turbine performance due to particulate-laden air.

In the past, filters have been retained in their respective holding frames by various methods. For example, a lift and drop method has been used where a holding frame is comprised of horizontal channels, the top channel being deeper than the bottom channel. This allows a filter to be inserted into the top channel and then dropped into the bottom channel. The advantage of this method is simplicity and lack of clips and/or clamps. However, the sealing of the filter and its frame relies on the airflow through the filter creating a force that compresses the filter gasket. As a result, the sealing is not 100 percent effective. Moreover, due to the weight of typical V-cell filters, this method is not suitable for front panel filters. A spring clip method has also been used where four (4) spring clips are located in the respective corners of each filter to provide a more positive compression of the filter gasket. This method is more complex and costly, however, and the spring clips are not robust. Another technique employs a screw-clamp located in each corner of the filter for compressing the filter gasket. Effective compression of the gasket is achievable, but difficult to confirm. With this technique, removal and replacement of filters is a time-consuming process, due to the length of the screws employed. The screws also pose a potential health and safety risk to the extent they protrude from the holding frame. Moreover, None of the above methods are suitable for both retention and sealing of back-to-back V-cell filters in a single frame assembly.

BRIEF SUMMARY OF THE INVENTION

In accordance with a first exemplary but non-limiting embodiment, there is provided a filter holder assembly comprising at least one frame having a peripheral wall and an inwardly directed peripheral edge substantially perpendicular to the peripheral wall and adapted to support a filter; at least one cam lock lever secured to the peripheral wall at a first predetermined distance from the inwardly directed peripheral edge for compressing the filter in the frame and against the inwardly directed peripheral edge, the cam lock lever having a handle portion at one end thereof and a cam head provided with a cam foot at an opposite end thereof, wherein the cam lock lever is rotatable to cause the cam foot to move between an open position and a clamping position wherein, in the clamping position, the cam foot exerts a compressive force on the filter.

In another aspect, the invention relates to a filter holder assembly comprising a plurality of frames in a substantially planar grid, each of the plurality of frames defined by a peripheral wall including two pair of substantially parallel side walls and an inwardly directed peripheral edge adapted to support a filter, the grid including at least one group of four mutually adjacent frames wherein four converging side walls of the four mutually adjacent frames, respectively, intersect to define four corner quadrants, and wherein each of the four converging side walls is common to two of the four mutually adjacent frames; the peripheral wall having a height sufficient to support two filters in stacked relationship; each of the four corner quadrants having a first cam-lock lever secured by a pivot pin to one of the four converging side walls at a first predetermined distance from the inwardly directed peripheral edge for clamping one of the two filters against the inwardly directed peripheral edge, and a second cam lock lever secured by a pivot pin to an adjacent one of the four side walls at a second predetermined distance from the inwardly directed peripheral edge for clamping the other of the two filters against the first of the two filters; each of the cam lock levers comprising a handle portion at one end thereof and a cam head at an opposite end thereof, the lever rotatable to cause the cam foot to move between an open position and a clamping position wherein the cam head exerts compressive force on a respective one of the filters.

In still another aspect, the invention relates to A cam lock lever for holding a filter in a filter frame comprising an elongated handle portion at one end and a substantially circular cam head at an opposite end; and a cam foot extending laterally away from the substantially circular cam head.

The invention will now be described in connection with the drawings identified below.

BRIEF DESCRIPTION OF THE DRAWINGS

FIG. 1 is a front elevation view of a single filter frame in accordance with an exemplary but nonlimiting embodiment of the invention;

FIG. 2 is a bottom plan view of the filter frame shown in FIG. 1;

FIG. 3 is a cross section taken along the line 3-3 of FIG. 1;

FIG. 4 is a side elevation of the frame shown in FIG. 1;

DETAILED DESCRIPTION OF THE INVENTION

Figure 5:
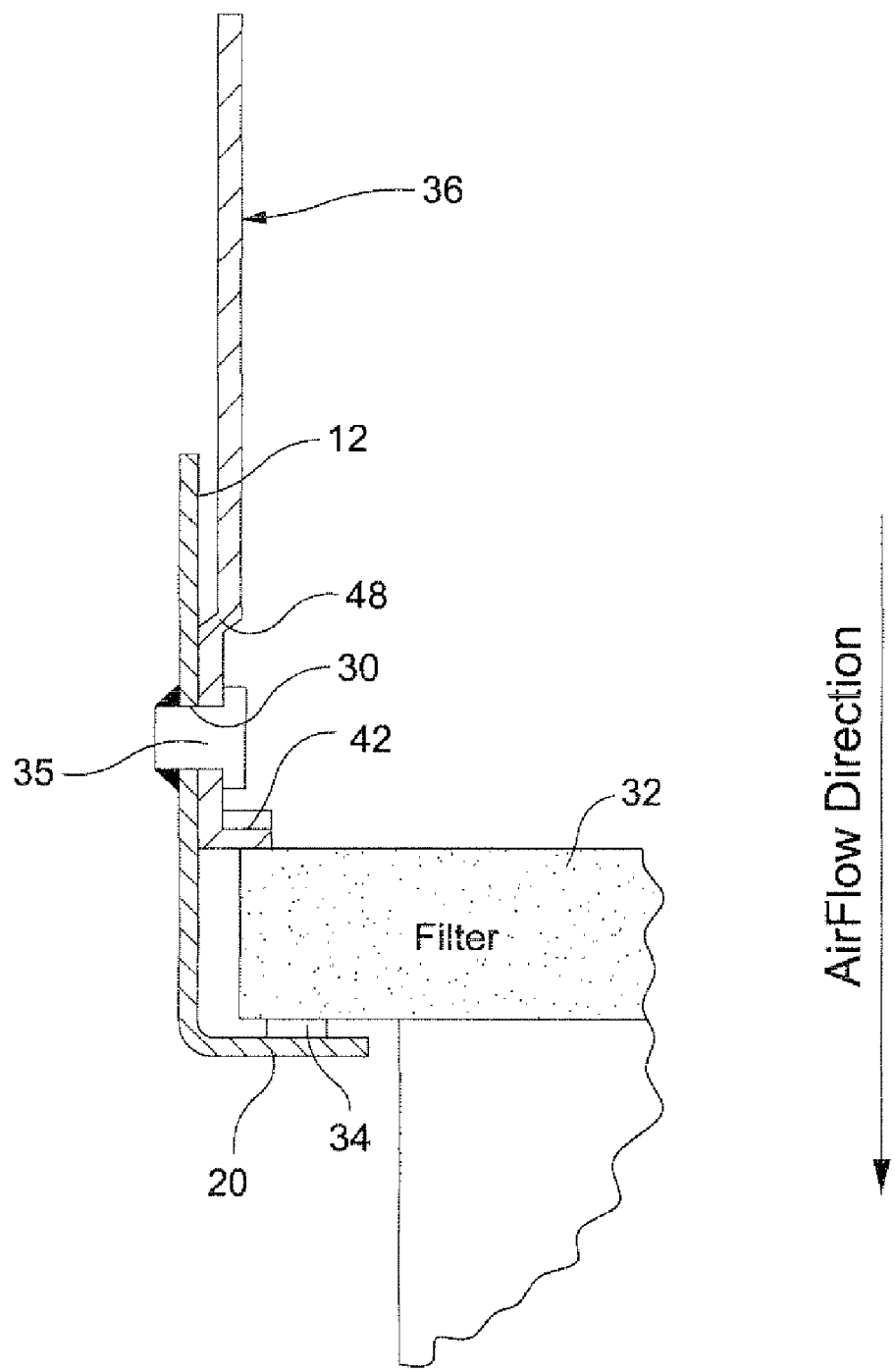
FIG. 5 is a cross section taken along the line 5-5 of FIG. 1, but with a filter in place and a cam lock lever installed.

With reference initially to FIG. 1-4, a filter holding frame 10 in an exemplary but non-limiting embodiment is substantially square in shape with two pair of substantially parallel side walls 12, 14, 16 and 18. At the respective lower edges of the walls, horizontal support flanges 20, 22, 24 and 26 are provided for supporting a substantially planar and substantially square filter as described further herein. Opposed side walls 14 and 18 are each provided with a pair of holes 28, while side walls 12 and 16 are each provided with a pair of holes or apertures 30. In the exemplary embodiment, holes 28 are located approximately 73 mm from the lower edge of the walls while holes 30 are located at approximately 43 mm above the lower edge of the walls. The frame as shown is designed to hold a single filter, or a pair of filters stacked in tandem. In the latter instance, in holes 28 and 30 support cam-locking devices at different elevations relative to the support flanges 20, 22, 24 and 26 as described further herein. The locations of the holes may vary, of course, depending on specific applications.

Figure 7:
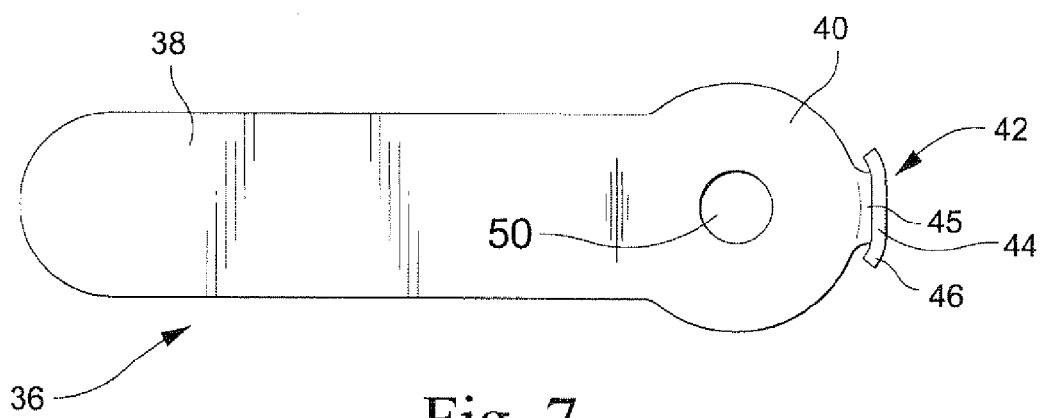
FIG. 7 is a side view of a cam lock lever in accordance with an exemplary but nonlimiting embodiment of the invention.
Figure 8:
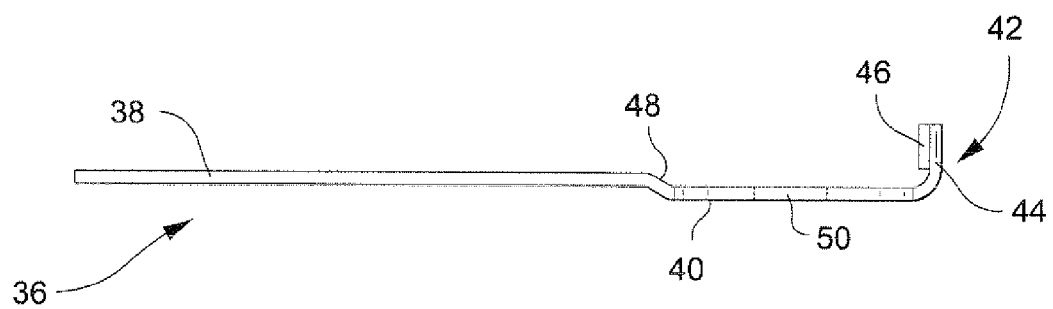
FIG. 8 is an edge view of the cam lock lever shown in FIG. 7.

FIG. 5 illustrates a portion of a substantially-square filter 32 having a resilient gasket 34 applied about the lower peripheral edge of the filter. The filter is supported on the lower horizontal support flanges 20, 22, 24 and 26 of the filter holding frame 10. FIG. 5 also illustrates a cam lock lever 36 mounted by way of a pivot pin 35 in one of the holes 30 of the filter holding frame 10. With reference to FIGS. 7 and 8, the cam lock lever 36 comprises an elongated handle portion 38 at one end and a substantially-circular cam head 40 at an opposite end. The cam head 40 mounts (or is formed with) a laterally-extending cam foot 42 that is generally aligned along the longitudinal axis of the lever 36. The cam foot 42 is formed to include a lateral extension 44 which is located axially beyond the radiused surface of the cam head 40 via tab 45, and is provided on one or both ends with a chamfered or upturned edge 46, the purpose for which will be described later herein. Centrally-located within the cam head 40, there is a mounting hole or aperture 50 also aligned along the longitudinal axis of the lever. The aperture 50 is adapted to receive the pivot pin 35 illustrated in FIG. 5 by which the cam lock lever 36 is rotatably mounted to the frame 10 via hole 30.

Figure 6:
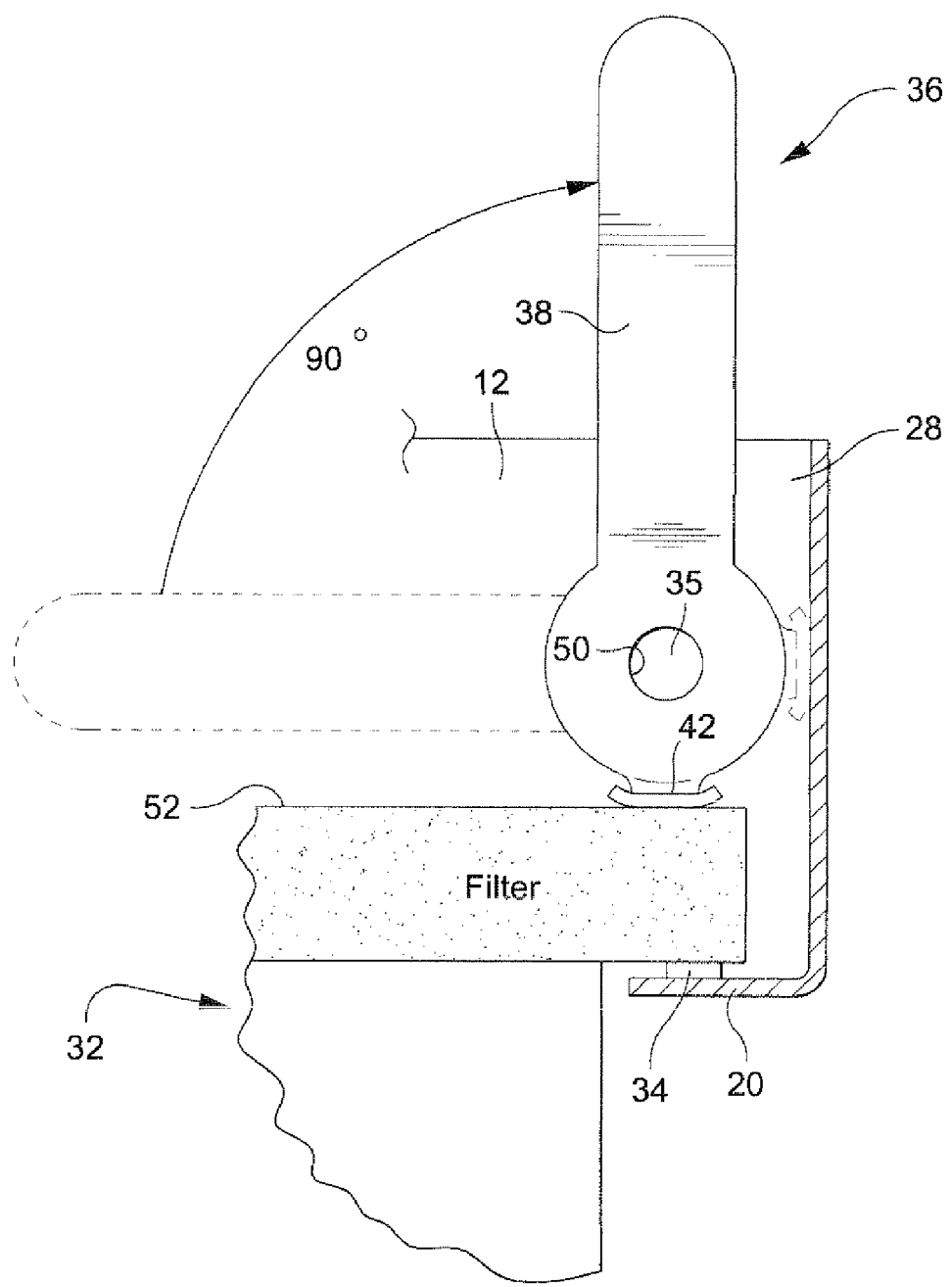
FIG. 6 is a partial section with the filter frame of FIG. 5 turned ninety degrees and showing the cam lock lever in locked and unlocked (in phantom) positions.

With specific reference to FIGS. 5 and 6, it will be appreciated that the location of the holes 30 in the holding frame side walls 12 and 16 is selected such that the cam lock levers 36 can move between open and clamped positions where, in the open position, the cam foot 42 may lightly engage, for example, the holding frame side wall 16 as shown in FIG. 6, and when rotated 90 degrees to the clamped position, the cam foot 42 will engage the upper surface 52 of the filter 32 with the chamfered or upturned edge 46 providing a smooth engagement with the filter in the direction of rotation of the lever 38, and then compress the filter 32 and the gasket 34 against the horizontal support flange 20 to thereby clamp and seal one corner of the filter 32 in place within the holding frame. Note also that the cam lock lever 36 is formed with an offset 48 which, at best appreciated from FIG. 5, provides space between the holding frame side wall 12 and the handle portion 38 to reduce friction and to facilitate gripping and rotation of the handle portion 38. It will be understood that cam-lock levers 36 may be installed in each of the four corners of the filter, utilizing the four mounting holes 30 as arranged in FIG. 1-4.

Figure 9:
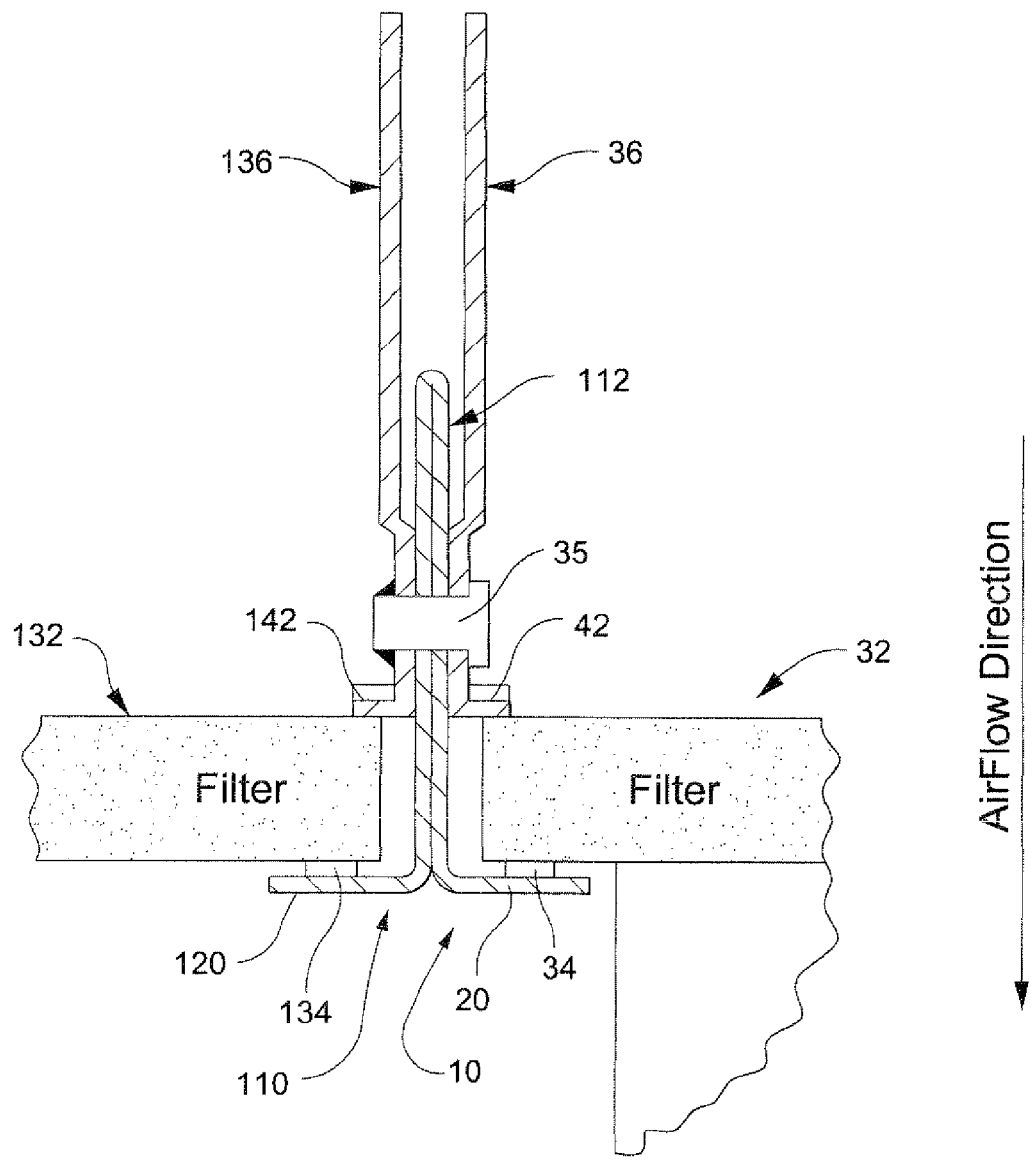
FIG. 9 is a cross section similar to FIG. 5 but showing a further exemplary embodiment where back-to-back cam lock levers are used to clamp adjacent filters within a multi-filter frame assembly.

In an alternative arrangement in FIG. 9, a filter-holding frame assembly includes adjacent filter-holding frames 10, 110, formed in part by a double-thickness, common side wall 112. In this embodiment, a second cam lock lever 136 may be installed with the first lever 36 but on the opposite side of the side wall 112. An extended pivot pin 35 enables assembly of the double cam lock lever. In this way, one double-cam lock device can be used to independently clamp two adjacent filters 32, 132 and their respective gaskets 34, 134 on adjacent support surfaces 20, 120 in the adjacent holding frames 10, 110.

It will be appreciated that the filter-holding frame assembly may be enlarged to include, for example, a planar grid that includes one or more groups of four mutually adjacent filter frames where four side walls converge at an intersection defining four corner quadrants, respectively, of four mutually adjacent frames. Each of the four intersecting side walls is common to two of the four mutually adjacent frames. If desired, one, two or all four of the side walls may be provided with a double-cam lock lever device as described above, proximate the intersection. This arrangement may be repeated throughout the grid as desired.

It will be appreciated, however, that the present invention is not limited to any particular holding frame arrangement.

Figure 12:
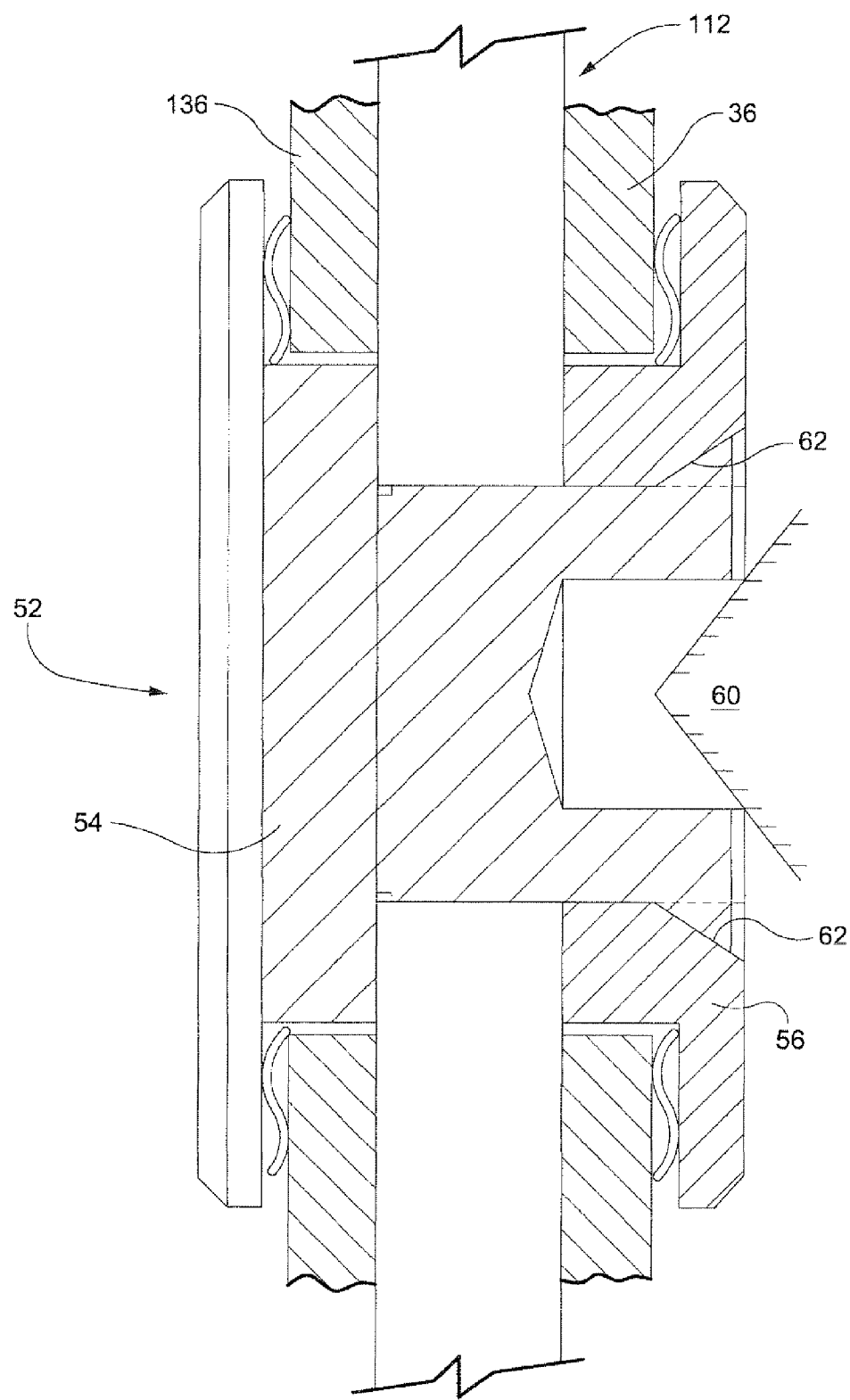
FIG. 12 is a partial cross section showing an alternative pivot mount arrangement for a cam lock lever.

An alternative pivot pin construction particularly useful in the multi-cam lock lever arrangement of FIG. 9 is shown in FIG. 12. The pivot pin 52 includes a first pin component 54 that is received within a second pin component 56. When mounting the cam lock levers 36, 136 to a frame-holding wall 112, the pivot pin assembly is installed from opposite sides of the holding frame wall, and a tool 60 is then used to swage the hollow end of the first pin component 54 radially outwardly into locking engagement with a beveled edge 62 of the second pin component 56 to thereby permanently secure the cam lock lever 36 to the holding-frame wall.

Figure 10:
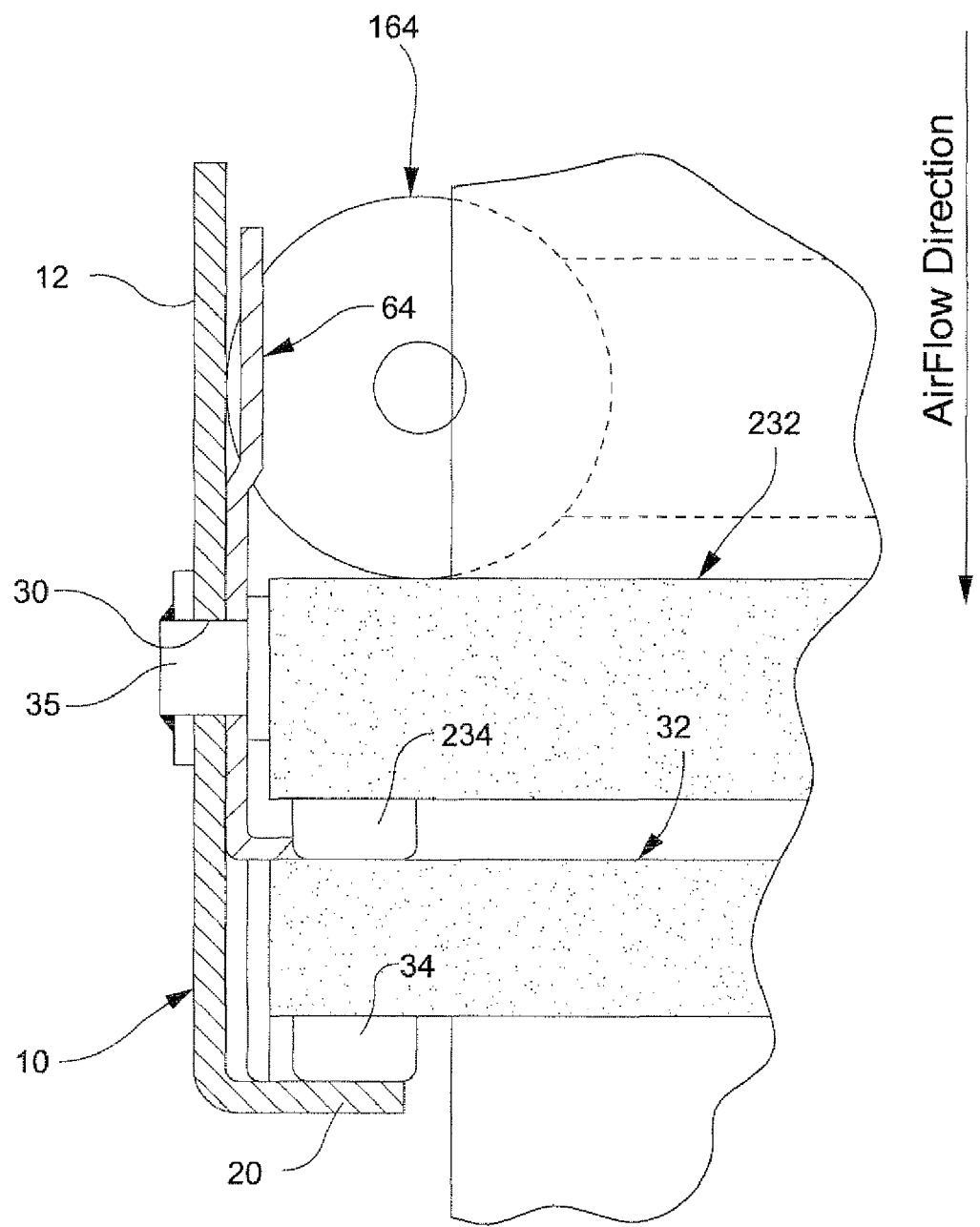
FIG. 10 is a cross section similar to FIG. 5 but showing a further exemplary embodiment where two filters are stacked in tandem within frame, and clamped by a pair of cam lock levers oriented at ninety degrees relative to each other.
Figure 11:
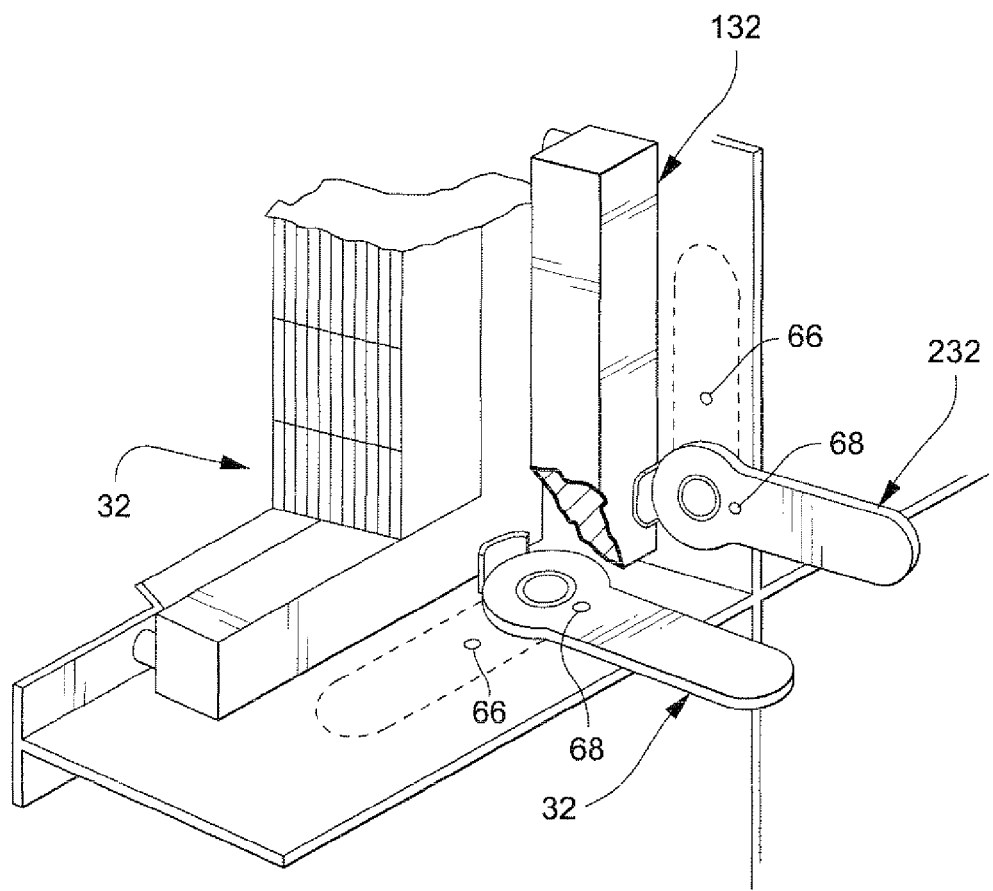
FIG. 11 is a partial perspective view of the stacked filter arrangement shown in FIG. 10.

In another exemplary embodiment, as best seen in FIGS. 10 and 11, a pair of filters 32, 232 may be stacked in tandem when a single holding frame 10 in which case, additional cam lock levers 64, 164 may be secured by means of the vertically-spaced holes 28 on the holding frame side walls 14, 18 and utilized to clamp the second or stacked filter 232 in substantially the same manner as described above. It will be appreciated that the cam lock levers mounted in the holes 30 extend substantially 90 degrees relative to the cam lock levers mounted in the holes 28. Thus, for a stacked arrangement, four cam lock levers may be used to clamp the corners of the lower or downstream filter 32 and four cam lock devices may be used to clamp the corners of the upper or upstream filter 232 but arranged at a 90 degree angle relative to the cam lock levers clamping the lower filter.

This arrangement allows the upper or upstream filters 232 to be removed from the filter holding frame while the underlying lower or downstream filter 32 remains clamped and sealed within the holding frame. This is important in that any particles dislodged due to removal/replacement of the upstream filter will not pass the downstream filter and, by keeping the downstream filter clamped and sealed, no dislodgement of any particles occurs at the downstream filter.

As apparent from FIG. 11, the stacked filters 32, 132 are shown in one of four partially shown mutually perpendicular filter frames. It will be appreciated that double-cam lock lever devices may be employed here as well to conveniently lock the filters in the respective adjacent frames, with a double-cam lock lever secured to each of the four intersecting holding frame side walls as described above.

It is another feature of the invention that the cam lock levers and the holding frame side walls be provided with cooperating projections and detents to prevent accidental movement of the cam lock levers from either the open or closed (i.e., clamped) position. More specifically, detents 66 (FIG. 11) are provided in the holding frame side walls where they are engaged by projections 68 stamped or otherwise formed in the cam lock levers 32, 232 in both the open and closed (or clamped) positions. Other substantially equivalent means for providing the retention or locking function may be employed as well.

Figure 13:
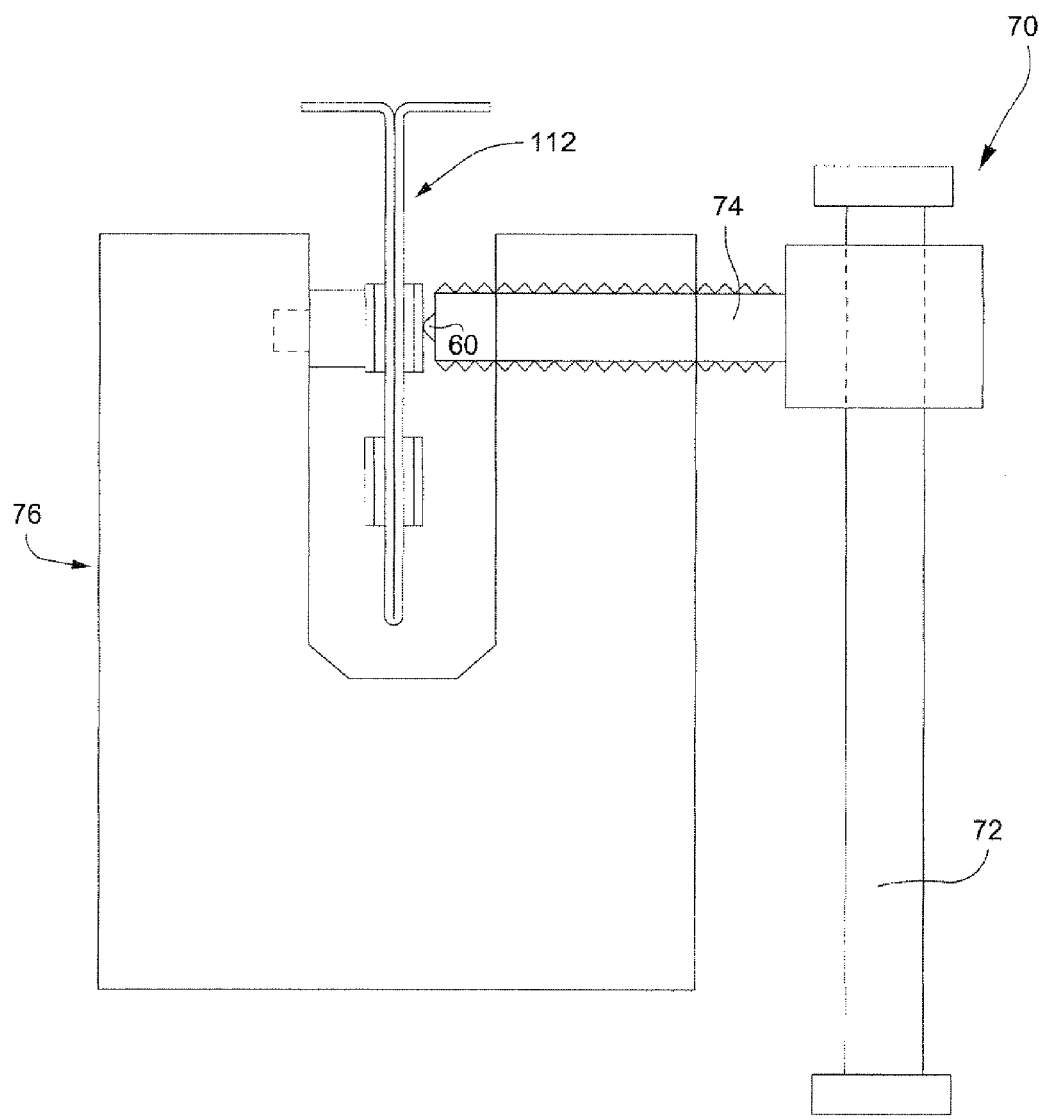
FIG. 13 is a side elevation showing a tool used to swage the pivot pin shown in FIG. 12.

FIG. 13 illustrates a tool stand assembly 70 employed to support the tool 60 used to deform the pivot pin assembly 52 shown in FIG. 12. The tool 60 may be adjusted along vertical and horizontal shafts 72, 74 to locate the tool 60 as needed. At the same time, the frame 112 is held in a U-shaped support frame 76. Note that in this view, the individual cam-lock levers are only partially shown.

Figure 14A:
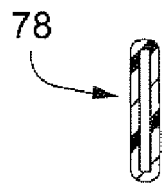
FIGS. 14A and 14B are section and side elevation views, respectively, showing an operating handle or tool for use with the cam lock lever shown in the various Figs.
Figure 14B:
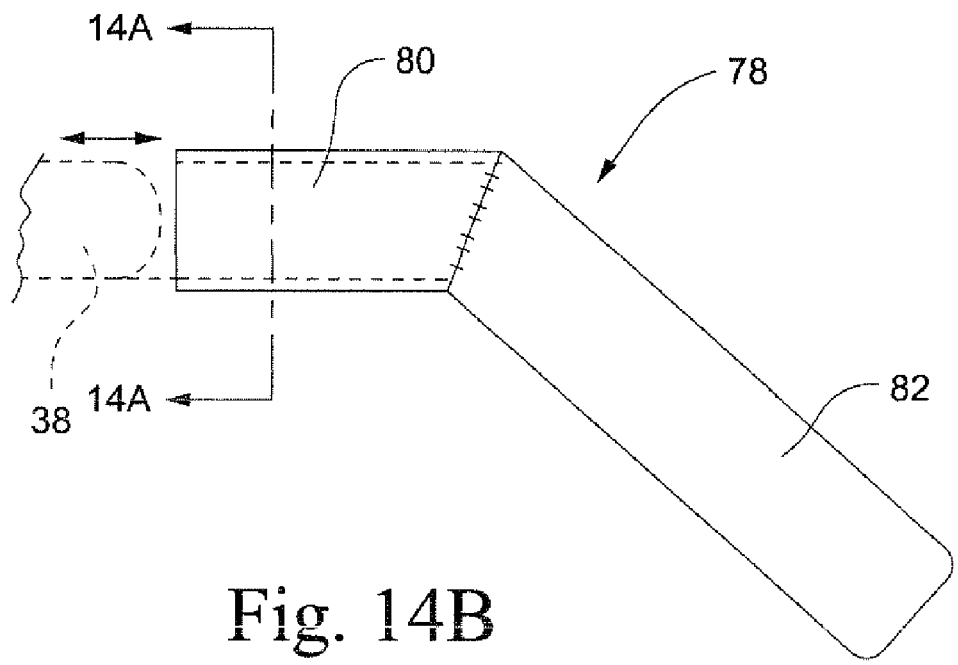

Turning now to FIG. 14, a cam lock lever operating handle or tool 78 may be slidably attached to the distal end of the elongated handle portion 38 cam lock lever 36 to facilitate rotation. The tool 78 is comprised of a hollow sleeve that includes a first portion 80 that is substantially coaxial with the handle portion 38 and an angled portion 82 that extends angularly away from the first portion 80. The angled portion 82 provides a more convenient gripping surface for the user as the cam lock lever is rotated between its open and closed (or clamped) positions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A filter holder assembly comprising at least one frame having a peripheral wall and an inwardly directed peripheral edge substantially perpendicular to said peripheral wall and adapted to support a filter; at least one cam-lock lever secured to said peripheral wall at a first distance from said inwardly directed peripheral edge for compressing the filter in said frame and against said inwardly directed peripheral edge, said cam-lock lever having a handle portion at one end thereof and a cam head provided with a cam foot at an opposite end thereof, wherein said cam lock lever is rotatable about a pivot pin to cause said cam foot to move between an open position and a clamping position wherein, in said clamping position, said cam foot exerts a compressive force on said filter, and wherein said cam foot is axially aligned with said handle portion and a longitudinal axis of said cam lock lever passing through said handle portion and said pivot pin.

2. The filter holder assembly of claim 1 wherein said peripheral wall of said frame comprises two pair of substantially parallel side walls defining four corners, and wherein opposite ends of each side wall of at least one of said two pair of substantially parallel side walls are provided with one of said cam lock levers.

3. The filter holder assembly of claim 1 wherein said cam lock lever is secured to said peripheral wall by a pivot pin comprised of first and second pin components, said first pin component deformed into locking engagement with said second pin component.

4. The filter holder assembly of claim 1 wherein said cam head comprises a substantially round portion with said pivot pin extending through a center of said substantially round portion, said cam foot extending substantially perpendicularly from said cam head.

5. The filter holder assembly of claim 4 wherein said cam foot is laterally offset from said cam head and has at least one upturned edge.

6. The filter holder assembly of claim 1 wherein said cam foot has upturned edges at opposite ends thereof.

7. The filter holder assembly of claim 1 wherein said handle portion is fitted with an operating tool having a first portion extending over said handle portion and a second extending angularly away from a remote end of said handle portion.

8. The filter holder assembly of claim 1 wherein said at least one frame comprises at least two adjacent frames adapted to hold a pair of filters in side-by-side relationship, and wherein a pivot pin supports a double cam lock lever formed by said lever and one additional, independently pivotable lever on an opposite side of said peripheral wall, each lever adapted to independently clamp one of said adjacent filters to respective ones of said at least two adjacent frames.

9. The filter holder assembly of claim 1 wherein said at least one frame comprises multiple frames in an ordered, substantially planar array adapted to hold a plurality of like filters, said array defining at least one corner intersection of four side walls of four different frames, and wherein one of said double cam lock levers is supported on at least two of said four side walls proximate said at least one corner.

10. The filter holder assembly of claim 2 wherein said peripheral wall has a height sufficient to support two filters in stacked relationship, and wherein opposite ends of each side wall of a remaining pair of said substantially parallel side walls are provided with one of said cam lock levers secured by pivot pins at a second distance from said inwardly directed peripheral edge greater than said first distance.

11. The filter holder assembly of claim 1 wherein said handle portion and said peripheral wall are provided with means for retaining said at least one cam-lock lever in said open position and in said clamping position.

12. A filter holder assembly comprising at least one frame having a peripheral wall and an inwardly directed peripheral edge perpendicular to said peripheral wall and adapted to support a filter; at least one cam-lock lever secured to said peripheral wall at a first distance from said inwardly directed peripheral edge for compressing the filter in said frame and against said inwardly directed peripheral edge, said cam-lock lever having a handle portion at one end thereof and a cam head provided with a cam foot at an opposite end thereof, wherein said cam lock lever is rotatable to cause said cam foot to move between an open position and a clamping position wherein, in said clamping position, said cam foot exerts a compressive force on said filter; and
  wherein said cam foot is laterally offset from said cam head and has at least one upturned edge.

13. The filter holder assembly of claim 12 wherein said cam foot has upturned edges at opposite ends thereof.

14. The filter holder assembly of claim 12 wherein said peripheral wall of said frame comprises two pair of substantially parallel side walls defining four corners, and wherein opposite ends of each side wall of at least one of said two pair of substantially parallel side walls are provided with one of said cam lock levers.

15. The filter holder assembly of claim 12 wherein said cam lock lever is secured to said peripheral wall by a pivot pin comprised of first and second pin components, said first pin component deformed into locking engagement with said second pin component.

16. The filter holder assembly of claim 12 wherein said handle portion is fitted with an operating tool having a first portion extending over said handle portion and a second extending angularly away from a remote end of said handle portion.

17. The filter holder assembly of claim 12 wherein said at least one frame comprises at least two adjacent frames adapted to hold a pair of filters in side-by-side relationship, and wherein a pivot pin supports a double cam lock lever formed by said lever and one additional, independently pivotable lever on an opposite side of said peripheral wall, each lever adapted to independently clamp one of said adjacent filters to respective ones of said at least two adjacent frames.

18. The filter holder assembly of claim 12 wherein said at least one frame comprises multiple frames in an ordered, substantially planar array adapted to hold a plurality of like filters, said array defining at least one corner intersection of four side walls of four different frames, and wherein one of said double cam lock levers is supported on at least two of said four side walls proximate said at least one corner.

19. The filter holder assembly of claim 14 wherein said peripheral wall has a height sufficient to support two filters in stacked relationship, and wherein opposite ends of each side wall of a remaining pair of said substantially parallel side walls are provided with one of said cam lock levers secured by pivot pins at a second distance from said inwardly directed peripheral edge greater than said first distance.

20. The filter holder assembly of claim 12 wherein said handle portion and said peripheral wall are provided with means for retaining said at least one cam-lock lever in said open position and in said clamping position.

\* \* \* \* \*